Figure 1:
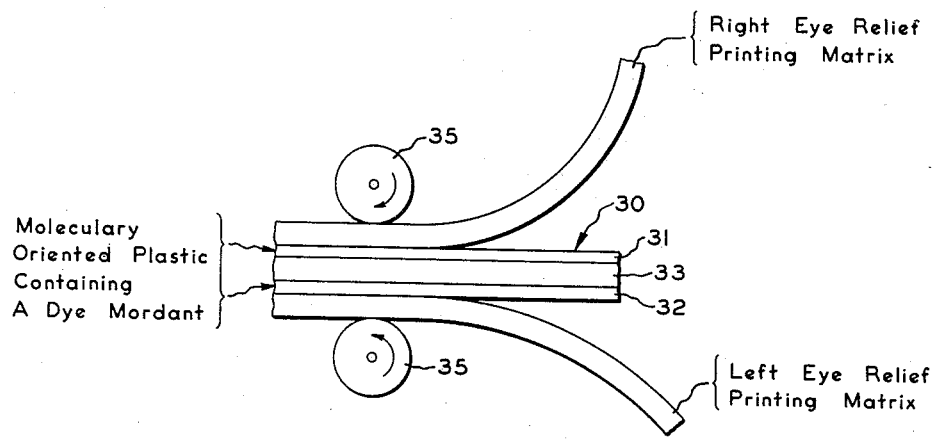

Jan. 13, 1959   W. H. RYAN ET AL   2,868,077
FILM STOCK FOR DICHROIC DYE IMAGES
Filed July 19, 1954

INVENTORS
William H. Ryan
and
Vivian K. Walworth
BY Brown and Mikulka
and
Moncure B. Berg
ATTORNEYS United States Patent Office 2,868,077
Patented Jan. 13, 1959

2,868,077

FILM STOCK FOR DICHROIC DYE IMAGES

William H. Ryan, Billerica, and Vivian K. Walworth, Concord, Mass., assignors to Polaroid Corporation, Cambridge, Mass., a corporation of Delaware Application July 19, 1954, Serial No. 444,074

11 Claims. (Cl. 88—65)

This invention relates to improvements in photographic film stock of the type suited for the formation therein of light-polarizing dichroic dye images by transfer printing techniques utilizing relief printing matrices, as well as to an improved product resulting from predetermined dyeing of said film stock to provide one or more dichroic dye images therein and comprising film stock which bears one or more light-polarizing dye images.

Objects of the invention are to provide improved film stock of motion picture and cut film type for the reception of light-polarizing images formed of dichroic dyes and comprising one or more layers of an orientable, dyeable, transparent, high molecular weight, hydroxyl-containing, vinyl polymer which has the molecules thereof highly oriented in a predetermined direction and in which there is incorporated a mordant or fixing agent for holding dichroic dyes in place, especially a mordant of the nature which comprises an organic compound containing basic nitrogen; to provide film stock of the character described having a mordant for a dye therein which is characterized by being transparent and substantially colorless and by being compatible with material of each said layer and substantially without influence or effect upon the orientation properties of said layer; and particularly to provide film stock of such nature wherein the image-receptive layers thereof are polyvinyl alcohol.

Other objects of the invention are to provide products in the form of film stock of the nature described comprising a support carrying thereon a dyeable layer of an image-receptive material comprising a sheet of an oriented, plastic polymer of the described character which has a substantially uniform distribution of a dye mordant contained therein; to provide a product having a transparent support carrying a pair of image-receptive layers, especially on opposite sides of said support, and which comprises sheets of an orientable polymer of the character described which have a dye mordant incorporated therein and which are in molecularly oriented condition so that the direction of orientation of the molecules of one of said layers is at 90° to the direction of orientation of the molecules of the other image-bearing layer whereby to provide film stock useful for forming light-polarizing stereoscopic image pairs thereon and comprising dye images.

Further objects of the invention are to provide a photographic type product comprising at least one layer of a transparent, high molecular weight, hydroxyl-containing, vinyl polymer having the molecules thereof predeterminedly oriented and including a substantially uniform distribution of a substantially transparent and colorless dye mordant therein together with at least one dichroic dye which is differentially dispersed and held fast in said layer by said mordant and which provides a photographic image of a light-polarizing nature; and to provide products of the character just described, especially including multicolor images formed of appropriately colored dichroic dyes and especially to such products which carry one or more stereoscopic pairs of dichroic dye images, particularly stereoscopic multicolor images.

Other objects of the invention will in part be obvious and will in part appear hereinafter.

The invention accordingly comprises the products possessing the features, properties and the relation of components which are exemplified in the following detailed disclosure, and the scope of the application of which will be indicated in the claims.

Figure 2:
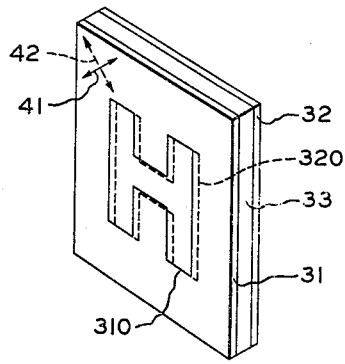

For a fuller understanding of the nature and objects of the invention, reference should be had to the following detailed description taken in connection with the accompanying drawing wherein:

Figure 1 is a diagrammatic illustration showing the manner of forming pairs of superposed light-polarizing stereoscopic dye images in stereoscopic film stock by the application to each side of the film stock of a printing matrix which contains, as a relief image, one of a stereoscopic pair of images to be printed and which is wet with a dichroic dye; and Fig. 2 is a diagrammatic perspective view of a stereoscopic color print produced on the stereoscopic film stock by the procedure illustrated in Fig. 1.

One practice for producing a light polarizer is to adsorb a dichroic dye in a transparent, molecularly oriented, linear, high molecular weight, hydroxyl-containing, vinyl polymer of which a preferred example is polyvinyl alcohol. Wherever a dichroic dye is adsorbed in a molecularly oriented plastic sheet of this nature, it renders the sheet light polarizing. Thus, oriented plastic materials of the nature previously described are, in general, useful to provide dye polarizers and are particularly suited as a medium for providing stereoscopic, light-polarizing prints in color.

Plastic sheet such as polyvinyl alcohol, and the like, is in general dyed by wetting the sheet with an aqueous dye solution. When a dye is transferred from a printing relief matrix onto a sheet of film on which the matrix is in contact, there is always a tendency for the dye being transferred to diffuse laterally. This diffusion results in the formation of a printed dye image which lacks the resolution of the matrix image. One practice for improving the reproduction in the printed dye image of the matrix image resolution is to incorporate a dye mordant in the material being printed. While various mordants have in the past been dispersed in gelatin photographic layers and while mordants have also been used in fibers of various cellulosic type plastics to facilitate the overall dyeing thereof, the art has in general failed to employ such techniques in carrying out dye image formation in hydroxyl-containing, vinyl polymers having the molecules thereof in highly oriented condition and of the character with which this invention is concerned. In distinction, the inventive concept herein is concerned with the employment, in dyeable sheets or layers of oriented polymers of the class described, of a mordant for dichroic dye and especially a mordant which may be incorporated in the polymeric layer without effect upon the ability of the polymer to be oriented and which may be retained in the layer after dye image formation.

Particular mordants or dye precipitants or fixing agents with which this invention is concerned are organic compounds containing basic nitrogen and of which one excellent example is a substance containing one or more amino groups. It is recognized that "A substance which holds the dye in place is called a mordant." Page 268, "Principles of Color Photography" (1953) by Ralph M. Evans, W. T. Hanson, Jr. and W. Lyle Brewer, John W. Wiley and Sons, Inc., New York; and by the use of the terms "dye mordant" or "mordant" in the specification and claims hereof, there is meant a substance of the nature just described.

With these aims and objects in mind, some explanation of the nature of stereoscopic print material and the manner of forming light-polarizing images therein by the predetermined application of dichroic dyes to the material will lead to a fuller understanding of the present invention.

In this regard, a suitable medium in which superposed, light-polarizing, stereoscopic left- and right-eye images may be formed is provided by the stereoscopic film stock 30 illustrated in Fig. 1 as comprising a laminar structure having two thin and transparent surface layers 31 and 32 mounted upon the opposite sides of a transparent support 33. The surface layers 31 and 32 are thin sheets of a transparent, molecularly oriented, high molecular weight, hydroxyl-containing, vinyl polymer of which a preferred example is polyvinyl alcohol, while the support 33 is any suitable transparent and substantially water-impermeable plastic such as cellulose acetate butyrate or cellulose triacetate.

The layer 31 has its molecules so oriented that the transmission or polarizing axis of the layer will be at 45° to the edge of the film stock 30, while the layer 32 has its molecules so oriented that the transmission or polarizing axis of the layer will also be at 45° to the edge of the film stock but will make an angle of 90° with the transmission axis of the layer 31. A preferred orientation is indicated by the arrows 41 and 42 in Fig. 2 which schematically illustrates the stereoscopic film stock 30 after image formation therein and shows the front layer 31 with transmission axis 41 extending upwardly to the right for receiving the right-eye picture of a stereoscopic pair and the rear layer 32 with its transmission axis extending upwardly and to the left for receiving the left-eye stereoscopic picture.

Film structures of this general nature are disclosed in U. S. Patent Nos. 2,289,714, 2,289,715 and 2,315,373. The film stock 30 provides a transparent structure useful as motion picture film or cut film. Additionally, the film stock 30 may be mounted upon an opaque, non-polarizing, reflecting base and used for the formation of light-polarizing reflection prints. Stereoscopic image pairs formed in the film stock 30 will be located in superposed relation to each other.

Image formation in the film stock 30 is carried out by printing with washoff relief matrices in each of which a solution of a suitable dichroic dye has been imbibed. The washoff relief matrices are prepared from photographic originals or duplicates thereof by conventional practices and, after imbibition of a solution of dichroic dye therein, are pressed into contact with the outer faces of the layers 31 and 32 to transfer portions of said solution to each of said layers.

Two sets of printing matrices, one for the right-eye image and one for the left-eye image, are used for the positive reproduction of a stereoscopic pair of images in suitable film stock such as the stock 30. For color positives, each set of matrices comprises two or more individual relief matrices which each bear a positive color separation record of one image of the stereoscopic pair of images to be reproduced. The individual matrices in a set used for color reproduction are printed successively on the stereoscopic film stock, for example the matrices representative of the cyan, magenta and yellow components of the color image to be reproduced may be applied to the film stock in the order just named.

A convenient means for simultaneously printing on opposite sides of the film stock 30 is schematically illustrated in Fig. 1 wherein the film stock 30 with a right-eye printing matrix and a left-eye printing matrix superposed on opposite sides thereof is shown as being passed between two rotating pressure-applying rolls 35 which cause the matrices to be pressed into intimate contact with the outer molecularly oriented layers 31 and 32 of the film stock.

A print or product resulting from the utilization of the procedure illustrated in connection with Fig. 1 is diagrammatically shown in Fig. 2 wherein film stock 30 is illustrated as containing a right-eye stereoscopic image 310 in the molecularly oriented layer 31 and a left-eye stereoscopic image 320 in the molecularly oriented layer 32. Image 310 is shown in full lines while image 320 is shown in dotted lines. For the purposes of simplification, the print shown in Fig. 2 has been considered as derived from a pair of stereoscopic records of the letter H and, in accordance with the process heretofore described, may be considered as providing a full-color stereoscopic print.

Viewing is carried out by observing these light-polarizing images 310 and 320 through polarizing filters located in front of each eye of the observer with the transmission axes thereof positioned at 90° to each other. Additionally, the light-polarizing filters are so positioned with respect to the light-polarizing images in the film 30 that each has its respective polarizing axis crossed or at 90° to the polarizing axis of the image to be observed therethrough. In this way, each eye sees substantially only the image intended for it.

The molecular orientation of a plastic sheet is customarily carried out by stretching the sheet in the presence of heat. Stretching is conducted by the application to the sheet of opposed tensional forces. As will be well understood, the result of such stretching is to cause orientation of the molecules of the sheet in a direction which is substantially parallel to the direction of application of the opposed stretching forces. The higher the degree of this stretching, the more complete will be the molecular orientation.

The effect of stretching on plastic sheeting may be determined empirically by printing a plurality of unit circles at intervals along a surface of the sheeting in its unstretched condition. When this sheeting is then stretched, it will be found that these circles have been converted into ellipses having major axes which extend in a direction generally parallel to the direction of application of the opposed stretching forces. The ratio of the major axis of such an ellipse to its minor axis is known as the axial ratio and is a measure of the degree of stretch imparted to the sheet. The higher this axial ratio, the higher the degree of stretch.

High axial ratios are desirable for the purpose of increasing the efficiency of the sheet polarizer. In general, the higher the axial ratio, the higher the efficiency of the sheet as a light polarizer. Axial ratios of the order of 3 and greater are of a nature suitable for providing molecularly oriented sheet of high orientation. Current production practices are consistently carried out to provide axial ratios of around 6 for molecularly oriented polyvinyl alcohol sheet.

As heretofore intimated, this invention is concerned with film stock adapted to bear light-polarizing dichroic dye images and comprising molecularly oriented, hydroxyl-containing, vinyl polymers in which a dye mordant has been incorporated. Also, as previously noted, the use of a mordant in photographic gelatin layers for the purpose of holding image dye therein is known to the art as well as the use of such a mordant in fibers of cellulosic derivatives such as cellulosic esters and the like for the purpose of assisting in the dyeing of such fibers. Additionally, the prior art has disclosed as mordants, in the prior uses just mentioned, organic compounds containing basic nitrogen. However, the prior art has failed to embody a mordant, and particularly a basic nitrogen-containing compound of the character noted, in hydroxyl-containing, vinyl polymers and especially polyvinyl alcohol. Likewise, the prior art has failed to employ a basic nitrogen-containing compound as a mordant in molecularly oriented film stock for fixing dichroic dye images in the stock.

By the invention described herein it has been discovered that basic nitrogen-containing compounds may be incorporated in high molecular weight, hydroxyl-containing, vinyl polymers to the end of providing a mordant therein for fixing a dichroic dye or dyes in the layers of such polymers. It has also been found by this invention that such polymers are compatible with vinyl compounds of the nature described and particularly polyvinyl alcohol and may be incorporated in sheets of such polymers without harming the orientation properties of these layers or sheets whereby the said sheets may be stretched to provide high axial ratio, i. e., greater than 3. The mordants employed should be substantially transparent and colorless and when incorporated in plastic sheets should result in a product of good optical homogeneity. It is additionally desirable in such mordants that they possess a nature such that they may be substantially immobilized in the plastic sheets in which they are incorporated to the end that they are not washed out by processing solutions. Such immobilization may result from the natural substantivity of the mordant for the vinyl carrier in which it is incorporated or by the employment of a mordant having a molecule size such that it becomes substantially immobile in the plastic layer or by other physical and chemical characteristics of the mordant.

A preferred example of a mordant of the nature with which this invention is concerned is a $\beta$-diethylaminoethyl-methacrylate polymer. Other mordants include polyethylene imine; an alkyl imidazoline hydroacetate; cetyl ethyl morpholinium ethyl sulfate; phenylbiguanide; a condensation product of formaldehyde and dicyandiamide; a complex tertiary amine acetate; dicyandiamide; poly 2-vinyl pyridine; and polyacrylamide.

The organic compound which provides the dye mordant is in corporated in film stock such as the film stock 30 by imbibition therein or is incorporated in the plastic dope which provides the layers of the film stock when the dope is cast. In this latter event, the image-receiving layers formed by the casting process are stretched and then laminated to their support.

Organic compounds containing basic nitrogen are recognized as being electron donors and are intended herein for employment with dichroic dyes which are in general provided by that class of dyes known as direct cotton dyes. Useful dichroic dyes include acid residues in their molecular structure, as for example a sulfonic acid group or a phenolic group. Dichroic dye compounds of this nature are recognized as being electron acceptors. The mechanism by which basic nitrogen-containing compounds are able to fix or hold fast dischroic dyes in molecularly oriented layers is not clearly understood but is believed to be the result of a salt-forming reaction wherein the basic nitrogen-containing compound, such for example as a compound containing one or more amino groups, reacts with an acid residue of the dye to form in the plastic layer a substantially immobile product or one which may be immobilized.

*Example I*

Poly $\beta$-diethylaminoethyl-methacrylate, which is generally water insoluble but acid soluble, is dissolved in a dilute aqueous solution of acetic acid (3 to 5%) to provide a mordant containing liquid having a polymer concentration of approximately 1%. This solution of the polymer is imbibed into molecularly oriented film stock, such as the film stock 30, by immersing the stock in the solution for two minutes while holding the temperature of the solution at 70° F. It is preferable, following imbibition of this polymeric mordant into the film stock, to neutralize the stock by immersing it in a weak alkaline solution, for example an ammoniacal solution such as a 5% solution of ammonium hydroxide. This after-treatment is carried out for two minutes at a temperature of 70° F. The alkaline after-treatment, in addition to neutralizing the film stock, is effective for insolubilizing the polymeric mordant to aqueous solutions with which the film stock may be subsequently wetted.

*Example II*

A 10% solution of polyvinyl alcohol is provided by dissolving an appropriate quantity of polyvinyl alcohol in water. The polyvinyl alcohol solution is heated at about 95° F. until it becomes homogeneous and to the hot solution there is added a weak acetic acid solution of a $\beta$-diethylaminoethyl-methacrylate polymer to provide a concentration of from 1% to 4% of the polymeric mordant in sheet which is cast from this mixture. The mixture is suitably stirred until thoroughly mixed and is heated for from 5 to 20 hours at about 95° F. or until all air in the mixture has been driven out, following which the mixture of polyvinyl alcohol and the polymeric mordant is cast by conventional practices to provide sheet products. The cast sheet is preferably immersed in a weak ammonium hydroxide solution following which it is subjected to stretching to orient the molecules thereof to a desired degree and is then laminated to a support such as the support 33 of the film stock 30.

*Example III*

Five parts by weight of phenyl biguanide are dissolved in 95 parts distilled water. The film stock is immersed in this solution for about five minutes while holding the temperature of the solution at about 70° F., i. e., room temperature. Excess treating solution is suitably removed from the film stock by any conventional practices, as for example by passing between wringer rolls and the stock is dried at a temperature of from 100° to 120° F.

Examples I and II have shown after-treatment of the film-stock after the incorporation of the mordant therein while in Example III no after-treatment is carried out. In the case of Examples I and II, the after-treatment is desirable to neutralize the film stock and insolubilize the mordant. Additionally, after-treatment may be carried out in some instances for the purpose of precipitating the mordant in the film stock.

For example, when an aqueous solution of cetyl ethyl morpholinium ethyl sulfate is imbibed into molecularly oriented polyvinyl alcohol, it is desirable to subsequently precipitate the mordant by after-treatment. A precipitant suitable for this purpose is an aqueous solution of mono and dibutyl naphthylene sodium sulfate, to which a small quantity of sodium sulfate is added. Such a solution is recognized by the art as providing a conventional type of anionic wetting agent and is a precipitant for the mordant just named. Similarly, in the case where a condensation product of formaldehyde and dicyandiamide are imbibed in molecularly oriented polyvinyl alcohol, it is desirable to precipitate this mordant in the sheet by after-treatment with a 5% ammonium hydroxide solution.

As has been intimated, after-treatment is unnecessary in instances where the mordant or fixing agent is easily introduced into the sheet and is retainable therein in generally insolubilized condition as for example the mordant set forth in Example III.

In general, the other mordant compounds specifically mentioned but not referred to in Examples I through III are incorporated in oriented, hydroxyl-containing, vinyl polymers in the same manner and in general in the same quantities as given in the specific examples.

Mordants are incorporated in oriented sheet materials to assist in image formation therein by effecting a more rapid dye transfer from printing matrices, a more complete dye transfer from the matrices, the formation of transfer images of high definition, and for improving the wash fastness of the dye in the layer. In particular, a property of a mordant is to attract a dye and assist in effecting its removal from a matrix. By the law of mass action, it follows that the more effectively dye is removed from a matrix, the greater will be the quantity of the dye transferred to the end of producing images of desired high density. Additionally, this attraction offered by a mordant for the transfer of dye improves reproducible image resolution.

Transfer printing is carried out with the film stock in a wetted condition whereby to assure good overall contact between the surface being printed and the relief printing matrix pressed thereon. Such wetting of the film stock may be with water. One effect of stretching a plastic sheet, such as polyvinyl alcohol, is to cause the sheet to develop a resistance to dissolution in aqueous solution at given temperature. In general, this decrease in solubility of the plastic material in aqueous solution is a function of the degree of its molecular orientation. Such decrease in the solubility of the plastic material affects the ability of an aqueous solutions to permeate a sheet of the same and, as previously indicated, affects the printing in the sheet by dye transfer processes of light-polarizing images formed of dichroic dyes. In instances where a mordant is insufficient to overcome these undesired conditions in highly molecularly oriented plastic sheeting of the character with which this invention is concerned, it becomes desirable to pretreat the sheet with suitable reagents in aqueous solution.

Preconditioning of this nature is carried out by contacting the film stock with a solution of a reagent or reagents which precondition the stock to increase its receptivity to dye and improve the dyeing qualities thereof in general. Our copending application Serial No. 431,396, filed May 21, 1954, describes prewetting solutions comprising aqueous solutions of iodides, while our copending application Serial No. 431,341, filed May 21, 1954, describes preferred iodide solutions comprising aqueous solutions of iodide ions and bivalent metal ions from the class consisting of cadmium, magnesium and beryllium. Additionally, mention may be made of aqueous prewetting solutions comprising iodide ions or salts of certain weak organic acids or both. Preconditioning treatment of this nature is carried out by immersing a film stock such as the stock 30 in a pretreatment solution for an appropriate time at appropriate temperature, following which the film stock is printed by application of the dye transfer matrices. By the present invention, a film stock such as the stock 30 having molecularly oriented polyvinyl alcohol layers 31 and 32 which each contain a mordant such as a β-diethylaminoethyl-methacrylate polymer, and which have been pretreated with an aqueous solution of sodium acetate of a concentration of approximately 5%, have been effective to permit the reproduction therein of dichroic dye images of adequate density for motion picture purposes, i. e., 2.7 or higher, and a high image resolution, for example, 60 lines per millimeter.

In general, direct cotton dyes of an essentially elongated structure may be named as suitable for forming light-polarizing images in molecularly oriented plastic materials, and especially molecularly oriented polyvinyl alcohol. Dyes of this nature are set forth in the previously mentioned patents and, as specific examples thereof, mention may be made of Niagara Sky Blue 6B (C. I. 518) and Niagara Sky Blue (C. I. 520) for cyan; Solantine Red 8BL (C. I. 278), Solantine Pink 4BL (C. I. 353) for magenta; and Solantine Yellow 4GL (Prototype 53) and Stilbene Yellow 3GA (C. I. 622) for yellow.

Throughout the specification and claims, reference has been made to orientable, linear, high molecular weight, hydroxyl-containing, vinyl polymers and specifically to polyvinyl alcohol. Such reference will be understood to include polymers which have not been completely hydrolyzed, as for example partially hydrolyzed polyvinyl acetate, and is further intended to embrace polymers which may or may not have been subjected to stabilization by treatment with boric acid or other cross-linking agent, provided the polymeric material exhibits essentially the properties recognized by those skilled in the art as characteristic of commercially available polyvinyl alcohol.

Since certain changes may be made in the above products without departing from the scope of the invention herein involved, it is intended that all matter contained in the above description or shown in the accompanying drawing shall be interpreted as illustrative and not in a limiting sense.

What is claimed is:

1. An organic-dye, light-polarizing film material having a high density and a resulting improved polarizing efficiency, said film material comprising a transparent, high molecular weight, water-soluble, hydroxyl-containing vinyl polymer having its molecules oriented in a given direction, a dichroic direct cotton dye contained in at least a given portion of said film material so as to render said portion light polarizing, and a mordant having an affinity for said dichroic direct cotton dye which enhances the receptivity of said molecularly oriented vinyl polymer for said dichroic direct cotton dye and holds said dye substantially immobilized, said mordant comprising an organic, high molecular weight, polymeric compound containing basic nitrogen, said light-polarizing film material, by reason of said coaction of the vinyl polymer, dye and mordant, having a dye density which is substantially higher than that of an organic-dye light polarizer formed, respectively, from a similar hydroxyl-containing vinyl polymer and a similar dichroic direct cotton dye but which is devoid of said polymeric compound containing basic nitrogen.

2. An organic-dye, light-polarizing film material as defined in claim 1 wherein said dichroic direct cotton dye and said compound containing basic nitrogen are distributed throughout said film material to provide a substantially uniformly polarizing film material.

3. An organic-dye, light-polarizing film material as defined in claim 1 wherein said polymeric compound containing basic nitrogen is a β-diethylaminoethylmethacrylate polymer.

4. A film material incorporating a light-polarizing image which possesses a high density and marked contrast, resolution and sharpness, said film material comprising a transparent, high molecular weight, water-soluble, hydroxyl-containing vinyl polymer having its molecules oriented in a given direction, a differential distribution of a dichroic direct cotton dye contained in said film material and forming a light-polarizing image, and a mordant having an affinity for said direct cotton dye enhancing its reception and stabilization, said mordant comprising an organic, high molecular weight, polymeric compound containing basic nitrogen, said light-polarizing image, through the coaction of said vinyl polymer, dye and mordant, having a dye density which is substantially higher than that of, and a contrast, resolution and sharpness which are superior to those of a light-polarizing image formed of said direct cotton dye in a film material of said hydroxyl-containing vinyl polymer but which is devoid of said polymeric compound containing basic nitrogen.

5. A film material incorporating a light-polarizing image as defined in claim 4 wherein said polymeric compound containing basic nitrogen is a β-diethylaminoethylmethacrylate polymer.

6. A multilayer film material incorporating a stereoscopic pair of light-polarizing images each of which possesses a high density and marked contrast, resolution and sharpness, said film material comprising two layers formed of a transparent, high molecular weight, water-soluble, hydroxyl-containing vinyl polymer each having its molecules oriented in directions substantially at 90° with respect to the other and each comprising a differential distribution of at least one dichroic direct cotton dye forming a light-polarizing image therein, and a mordant having an affinity for said direct cotton dye for facilitating its acceptance and enhancing its stabilization, said mordant comprising an organic, high molecular weight, polymeric compound containing basic nitrogen, the light-polarizing image of each layer having a dye density which is substantially higher than that of, and a contrast, resolution and sharpness which are superior to those of a light-polarizing image formed of said dichroic direct cotton dye in a film material of said hydroxyl-containing vinyl polymer but which is devoid of said polymeric compound containing basic nitrogen.

7. A film material incorporating a multicolor light-polarizing image composed of a plurality of color-separation light-polarizing images which possess high density and marked contrast, resolution and sharpness, said film material comprising a transparent, high molecular weight, water-soluble, hydroxyl-containing vinyl polymer having its molecules oriented in a given direction, a differential distribution of at least two dichroic direct cotton dyes forming at least a pair of light-polarizing images therein, and a mordant having an affinity for said direct cotton dyes and enhancing their reception and stabilization, said mordant comprising an organic, high molecular weight, polymeric compound containing basic nitrogen, said light-polarizing images having a dye density which is substantially higher than that of, and a contrast, resolution and sharpness which are superior to those of light-polarizing images formed of said dichroic direct cotton dyes in a film material of said hydroxyl-containing vinyl polymer but which is devoid of said polymeric compound containing basic nitrogen.

8. A film material incorporating a multicolor light-polarizing image as defined in claim 7 wherein are included three secondary color-separation, light-polarizing images rendered in dichroic, direct cotton dyes.

9. A film material incorporating a multicolor light-polarizing image as defined in claim 7 wherein said color-separation light-polarizing images are applied to a single surface of said film material.

10. A film material incorporating a multicolor light-polarizing image as defined in claim 9, said film material constituting one of a pair of superimposed image-carrying film materials molecularly oriented at 90° with respect to one another, bonded together and forming a superimposed stereoscopic pair of multicolor light-polarizing images.

11. An organic-dye, light-polarizing film material having a high density and a resulting improved polarizing efficiency, said film material comprising a transparent high molecular weight, water-soluble, hydroxyl-containing vinyl polymer having its molecules oriented in a given direction whereby said polymer acquires a high axial ratio but a lessened dye receptivity, a mordant comprising an organic high molecular weight polymeric compound containing basic nitrogen, and a dichroic direct cotton dye, said mordant having an affinity for said direct cotton dye substantially balancing said lessened dye receptivity and providing substantial insolubilization of said dye, said light-polarizing film material, through the coaction of said vinyl polymer, dye and mordant, having a dye density which is substantially higher than that of an organic-dye light polarizer formed from a similar hydroxyl-containing vinyl polymer and a similar dichroic direct cotton dye but which is devoid of said polymeric compound containing basic nitrogen.

References Cited in the file of this patent

UNITED STATES PATENTS

| Number | Name | Date |
| --- | --- | --- |
| 2,063,348 | Seymour | Dec. 8, 1936 |
| 2,168,348 | Izard | Aug. 8, 1939 |
| 2,239,718 | Izard | Apr. 29, 1941 |
| 2,315,373 | Land | Mar. 30, 1943 |
| 2,423,504 | Land et al. | July 8, 1947 |
| 2,454,515 | Land | Nov. 23, 1948 |
| 2,675,316 | Carroll et al. | Apr. 13, 1954 |